May 14, 1963     S. BERK     3,089,378
RADIOISOTOPE METHOD FOR MEASURING THE
WEIGHT OF THE CONTENTS OF
ASSEMBLED ITEMS
Filed March 8, 1960
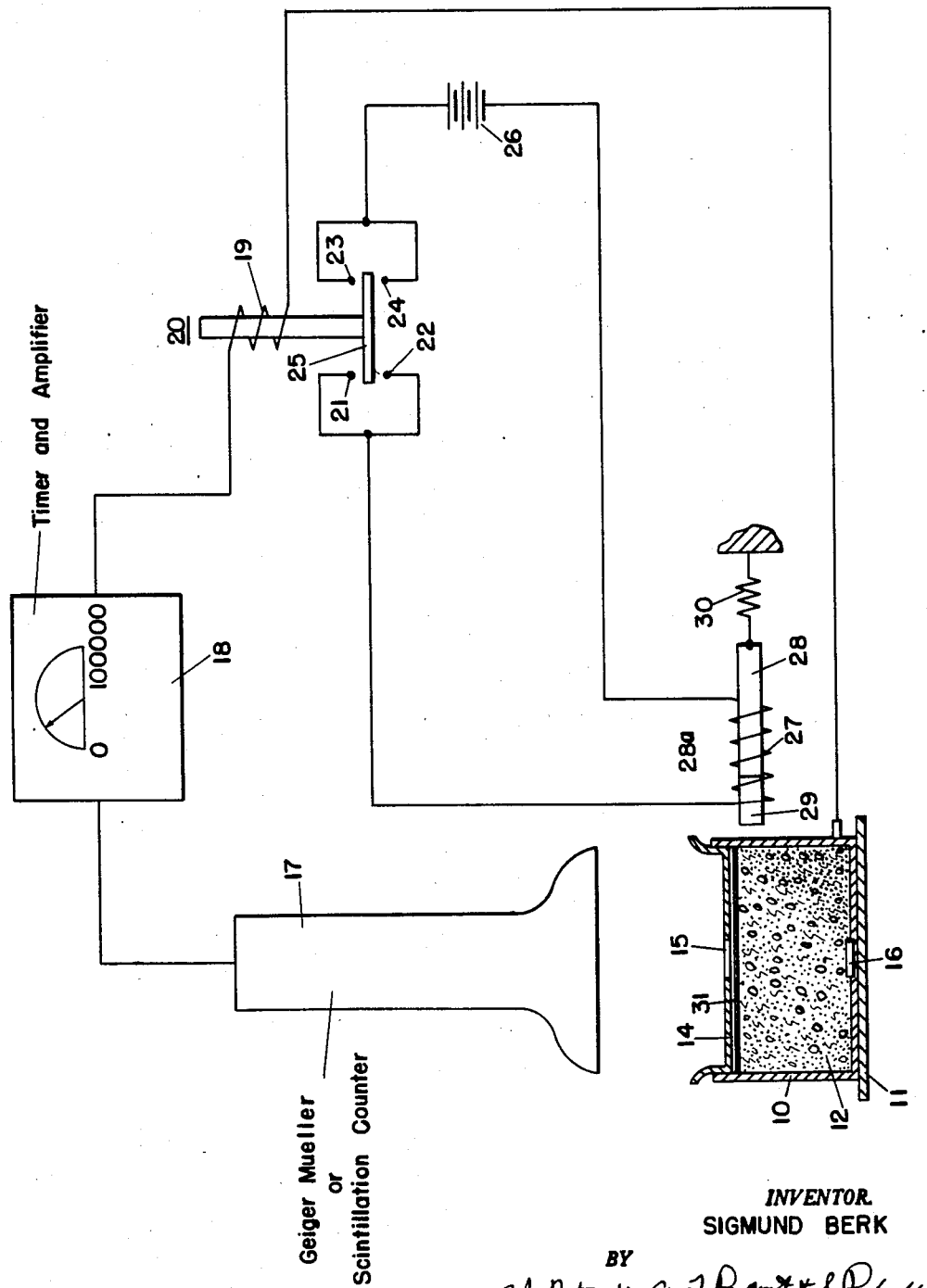
INVENTOR.
SIGMUND BERK
BY
ATTORNEYS.

United States Patent Office 3,089,378
Patented May 14, 1963

3,089,378
RADIOISOTOPE METHOD FOR MEASURING THE WEIGHT OF THE CONTENTS OF ASSEMBLED ITEMS
Sigmund Berk, Philadelphia, Pa., assignor to the United States of America as represented by the Secretary of the Army
Filed Mar. 8, 1960, Ser. No. 13,668
4 Claims. (Cl. 86—32)
(Granted under Title 35, U.S. Code (1952), sec. 266)

The invention described herein may be manufactured and used by or for the Government for governmental purposes without the payment to me of any royalty thereon.

This invention relates to methods for measuring the weight or density of a material enclosed within a container. It is hereinafter described as utilized to determine the weight of the primer pellets within a primer cup. It is useful in various other situations where the weight of a material is to be determined independently of its enclosure.

Small variations in pellet weight in certain types of ammunition produce large variations in ignition and action time. In order to eliminate light or undesired pellets, various types of gauging machines have been proposed. None of these machines have proved satisfactory for the reason that they accept pellets which are undesired and are refused by hand gauging methods.

In the manufacture of primers, the direct weighing of the primer pellets is impossible because (1) the variations in the weight of the brass primer cups is too great in comparison with the small differences in the weight of the pellets, and (2) the pellets are added to the cups in a wet state. This wetting of the pellets is done to avoid the hazards incident to the handling of the pellets in a dry state. After assembly, the primers are oven dried and are ready for use.

In accordance with the present invention, a radioactive material is combined or otherwise associated with the primer composition during the manufacture of the primer, and the weight of the pellets in the completed primer is determined from the radiation thereafter emitted by or transmitted through the primer composition.

This may be accomplished in various ways. Thus, if the primer composition is made radioactive by the inclusion of a radioactive element or by irradiating it with slow neutrons, the radiation emitted by it is directly proportional to the weight of the pellets. If a source of radiation is placed in the bottom of the primer cup prior to the addition the primer composition, the radiation transmitted through the top of the primer cup is inversely proportional to its weight of the primer mix in the cup.

Various types of apparatus may be utilized to measure the radiation emitted from the primer composition and to utilize this radiation to reject primers containing an undesired weight of the primer composition.

The single FIGURE of the drawing shows a primer cup 10 which is supported on a conveyor belt 11, is filled with a primer composition 12 and covered with a paper disc 31 and is closed by an anvil 14 having a central aperture 15. This primer may or may not have at its base a source of radiation 16 depending on which of the above identified methods is utilized.

In any case, the radiation emitted from the composition 12 is received by a Geiger-Mueller, or scintillation counter 17 and is timed and amplified by the timer-amplifier 18, the output of which is applied to the operating coil 19 of a relay 20. The relay 20 has fixed contacts 21 to 24 and a movable contact 25. It is so calibrated and arranged that (1) the contacts 21 and 23 are interconnected through the contact 25 when the primer pellets are smaller than desired and the emitted radiation has its highest value, (2) the contact 25 is intermediate between the two sets of contacts when the primer pellets are acceptable and the emitted radiation has an intermediate value, and (3) the contacts 22 and 24 are interconnected through the contact 25 when the pellets are too heavy and the emitted radiation has its lowest value. The foregoing is the sequence of events when a source of radiation is placed in the bottom of the primer cup, and the radiation transmitted through the top of the primer cup is inversely proportional to its weight of primer mix.

When the primer mix is made radioactive, the sequence is reversed since the radiation emitted is directly proportional to the weight of primer mix. However, the result is the same.

The contacts 21 to 24 are connected to an accept-reject circuit which includes a power source shown as a battery 26 and the operating coil 27 of a solenoid. This solenoid has a core 28 fixed at one end to a non-magnetic member 29 and at the other end to a spring 30 by which it is biased to its illustrated position. With these connections, the relay 28a functions to push the primer off the conveyor belt 11 only when the primer pellets are too light or too heavy.

In radioactivating the composition 12, the most obvious procedure is to add a radioisotope of one of the elements in the primer composition.

The most obvious solution to the problem for the detection of light primer pellets is to add the radioisotope of one of the elements in the primer composition. For example one of the primer pellet compositions is:

| | Percent |
|---|---|
| Lead styphnate | 42 |
| Barium nitrate | 48 |
| Calcium silicide | 9 |
| Acetylene black | 1 |

The method of approach would be to add radioactive barium nitrate with the nonradioactive barium nitrate and blend the mixture with the remaining compounds in the primer composition. After blending the mixture is added to the primer cups and after drying the radioactivity is assayed using a Geiger-Mueller or scintillation counter.

A modification of this method was tested. To a mixture of dummy powder composition, 1.2 ml. of an aqueous solution of $Ag^{110}NO_3$ (1 $\mu$c.) was added and triturated on a motor operated mortar and pestle. After drying, weighed amounts of the radioactive primer mix were added to the primer cups and assembled. The radiation emitted was measured with a scintillation counter and an average of 72 counts per minute per 0.01 grain of pellet weight was obtained as follows:

| Weight of Primer Pellet, Grains | Radioactivity Measured, Counts/Minute |
|---|---|
| 0.82 | 5,930 |
| 1.29 | 9,440 |
| 1.39 | 10,000 |
| 1.60 | 11,400 |

The results show that the method of incorporating a radioisotope directly in the primer mix can be used for the inspection of correct pellet weight in assembled items.

A second method is neutron activation, i.e., when certain elements are irradiated with slow neutrons they give rise to radioactive elements. These isotopes have their own characteristic radiation and modes of decay. For measuring primer pellet weight after assembly in the cup, a small amount of a chemical element (such as silver, with a large cross section (60 barns) and which results in a radioisotope with a very short half-life —24.2 seconds) is added to the primer mix before blending. After addition of the blended primer to the cup, the assembled cup is exposed to a source of neutrons (radium-beryllium or polonium-beryllium). The elements present will absorb neutrons and become radioactive. For example, the added silver reacts as follows:

$$Ag^{107} + n \rightarrow Ag^{108} + \gamma$$
$$Ag^{109} + n \rightarrow Ag^{110} + \gamma$$

$\gamma$ = gamma radiation
$n$ = neutron

Silver-110 has a short half life of 22-seconds, therefore a short interval of 10 seconds or less must be used for the measurement of the induced radioactivity. Immediately after irradiation with the neutron source, the radioactive pellet is placed under a radiation detector and the radioactivity measured. The amount of radioactivity present is a function of the weight of the primer mix present. The advantage of this method is that it eliminates the hazards of incorporating radioisotopes in the primer pellet powder.

A third method is based on measuring the change in intensity of the radiation as it penetrates the material; i.e., the amount of radiation transmitted is inversely proportional to the thickness of the material or the weight.

Either the electrode at the base of the primer cup is plated with a radioisotope, or a disc (paper or metallic foil) containing a radioisotope is placed in the primer cup before the addition of the primer mixture. The assembled electric primers are then passed under a Geiger-Mueller or scintillation counter and the attenuated radiation recorded. The degree of absorption of the radiation serves as an indicator of the weight of the primer pellet. With short half-life radioisotopes, such as radiophosphorus (P-32) the instrumentation has one gauge connected to a standard source in order to correct for the decay of the radioisotope. Also, the instrumentation can be designed to sort the cups with activities greater than, or less than, a predetermined count based on the desired primer pellet weight. For this investigation, two (2.0) grains or 130 milligrams was chosen as the minimum pellet weight. A dummy primer pellet with a density approximately that of the styphnate and containing lead isocyanate was weighed into the primer cups, the contents tamped down, and the support cup placed into position. Measurements of the attenuated radiation were made with a mica end window Geiger-Mueller counter (with a scintillation counter), or with a single channel gamma spectrometer for the cadmium-109.

The principles used in eliminating light pellet weight is that the amount of radiation transmitted is inversely proportional to the weight of the primer mix in the assembled cup. On the basis of the experimental work shown below, the method appears effective, practical, feasible, safe and economical to detect correct weight in assembled items. Table I shows the effectiveness and sensitivity obtained with the various radioisotopes in detecting correct primer pellet weight. For the primer composition used in the 2.00 grain pellet weight the order of effectiveness of the seven radioisotopes used was as follows: Cadmium-109 (best), ruthenium-106, tungsten-185, yttrium-90, phosphorus-32, cadmium-115, and silver-111 (least effective). Although the procedure described above was for rejecting pellet weights below 2.00 grain, the method may be used for controlling pellet weight within definite limits.

Table I.—Attenuation of Radiation Produced by Varying Amounts of Primer Pellet Assembled in Primer Cups Containing Discs of a Number of Radioisotopes Attached to the Base of the Primer Cup

| Weight of Primer Pellet, Grains | Radioisotopes Percent Radiation Transmitted | | | | | | |
|---|---|---|---|---|---|---|---|
| | Phosphorus-32 | Tungsten-185 | Cadmium-115 | Cadmium-109 | Silver-111 | Yttrium-90 | Ruthenium-106 |
| 0 | 100 | 100 | 100 | 100 | 100 | 100 | 100 |
| 1.78 | | | | | 0.9 | | |
| 1.90 | 2.2 | 20.5 | .8 | 52.4 | | 4.4 | 38.7 |
| 1.97 | | | | | 0.3 | | |
| 1.99 | | | | | | 3.2 | |
| 2.00 | 1.1 | 19.0 | .7 | 37.4 | | | 36.7 |
| 2.04 | | | | | | 2.7 | |
| 2.08 | | | | | 0.2 | | |
| 2.10 | .8 | | .3 | 31.0 | | 2.0 | 33.0 |
| 2.30 | | | | | | 1.1 | |
| Difference in Percent Radiation Transmitted Per .01 Grain in Region of 2.00 Grain Pellet | 0.07 | 0.15 | 0.03 | 1.07 | 0.01 | 0.12 | 0.28 |
| Order of Effectiveness in Attenuation of Radiation per Unit of Weight | 5 | 3 | 6 | 1 | 7 | 4 | 2 |

A method called the "internal" thickness gauge was developed to inspect assembled primers for pellet weights within certain limits. In this case the desired pellet weight was between 1.3 to 1.6 grains. Two beta emitting radioisotopes were used for the detection of correct pellet weight in the No. 33 primer. The first, phosphorus-32 is a pure beta emitter decaying with a 1.7 mev. beta particle and has a half-life of 14.3 days. Radiation from radioactive phosphorus can be shielded with Lucite and presents no radiation hazard to personnel. The second, ruthenium-106, is also a beta emitter with a maximum energy of 0.04 mev. and a half-life of 365 days. However, the energy release in the Ru-106 is due to the daughter radioisotope, rhodium-106, which is both a strong beta-emitter and a weak gamma emitter. Rhodium-106 has a half-life of 30 seconds and emits 68 percent of a very energetic beta (3.5 mev.).

The method used consisted of placing a paper disc impregnated with radio-phosphorus in the primer cup. A known weight of a dummy powder of potassium chloride and lead thiocyanate was added to the primer cup and the anvil inserted. The attenuated radiation was measured with a Geiger-Mueller counter. Table II shows the percent radiation transmitted for primer pellet weights of 1.21 to 1.70 grains.

Table II.—Attenuation of Radiation Produced by Varying Amounts of Primer Pellet Assembled in No. 33 Primer Containing a Disc With Radio-Phosphorus or Radio-Ruthenium in the Cup

| Weight of Primer Pellet Grain | Radioisotopes Percent Radiation Transmitted | |
|---|---|---|
| | Phosphorus-32 | Ruthenium-Rhodium-106 |
| 0 | 100 | 100 |
| 1.21 | | 32.0 |
| 1.24 | 17.0 | |
| 1.30 | 11.0 | 29.1 |
| 1.35 | 9.7 | |
| 1.45 | | 26.0 |
| 1.54 | | 23.5 |
| 1.55 | 4.7 | |
| 1.61 | 4.5 | |
| 1.70 | 3.9 | 22.8 |
| Difference in Percent Radiation Transmitted per 0.01 Grain in Region of 1.3 to 1.6 grains | .21 | .23 |

In the case of the ruthenium-106-rhodium-106 isotope, a copper disc plated with approximately one microcurie of the radioisotope was inserted into the primer cup prior to filling with the dummy powder. The same procedure was followed as with the radiophosphorus except that a stilbene scintillation counter was used to measure the radiation. Table II lists the percent radiation transmitted for the various pellet weights using the two radioisotopes. The more energetic beta radiation from the rhodium-106 daughter radioisotope transmits two to five times as much of the original radiation as the assembled radiophosphorus. Both P-32 and Ru-Rh-106 may be used to inspect primers for pellet weights between 1.3 to 1.6 grains. The result (Table II) shows that the method is extremely sensitive for accepting or rejecting pellets in the lower (1.3 grains) weight range. The sensitivity of the method is lower at the higher ranges (above 1.6 grains) for these two radioisotopes. The difference in percent radiation transmitted per 0.01 grain in the region of 1.3 to 1.6 grains is slightly higher for the Ru-106-Rh-106 isotope.

The type of radioisotope chosen depends on the type (atomic number) and amount of material the radiation must penetrate before being measured by the radiation detector. For example, for small amounts of material under 100 mg. of aluminum per square cm., beta emitters under 1 mev. (such as silver-111, cadmium-109) may be used. For 100–300 mg. of aluminum per sq. cm., beta emitters with energies from 1.7 to 3.5 mev. (P-32 and Ru-106) may be used. Above 300 mg. of aluminum per sq. cm., beta emitters with energies above 3 mev. or soft gamma emitters, such as cadmium-109 or osmium-191 (0.042 to 0.129 mev. gamma) may be used.

The choice of the radioisotope is also dependent on how soon after assembly the weight of the contents of the container will be measured. For example, if the time for correct weight determination after assembly is short, then a radioisotope with a short half-life is used, such as P-32 (14 days); if the time for correct weight determination after assembly is long then a radioisotope with a long half-life is used such as Ru-106 (365 days).

I claim:

1. In a method of manufacturing primers, such that the quantity of primer composition therein is kept uniform from primer to primer, the steps comprising: mixing a wet primer composition with a radioactive source to achieve homogeneity and uniform radiation therefrom, maintaining the resulting homogeneous mixture in a wet condition, loading said homogenous mixture into primer cups, covering said homogeneous mixture with an anvil having a hole therein, passing said loaded primers under a radioactively sensitive device at a preselected distance therefrom, measuring the radiation emitted from said mixture, said radiation being directly proportional to the amount of mixture in said primer cup, translating said radiation into a potential proportional thereto, and applying said potential to means whereby only those primers causing a potential within a given range are selected and primers causing a potential outside of said given range are rejected.

2. A method of manufacturing primers, such that the quantity of primer composition therein is kept uniform from primer to primer, the steps including: combining a predetermined quantity of barium nitrate with a predetermined quantity of radioactive barium nitrate mixing the resulting combination with wet lead styphnate, calcium silicide and acetylene black to make a wet homogenous radioactive primer mixture, maintaining said mixture in a wet condition, loading said mixture into primer cups; covering said mixture with an anvil having a hole therein; passing said loaded primer cups under a radioactively sensitive device at a preselected distance therefrom, measuring the radiation emitted from said mixture, said radiation being directly proportional to the quantity of mixture in said primer cups, translating said radiation into a potential proportional thereto; and applying said potential to means whereby only those primers causing a potential within a given range are selected and other primers not causing a potential within a given range are rejected.

3. In a method of manufacturing primers, such that the quantity of primer composition therein may be kept uniform from primer to primer, the steps comprising: mixing said primer composition in a wet state with an element having a high neutron cross-section to obtain a wet homogeneous explosive mixture; maintaining said mixture in a wet condition; loading the resulting mixture in primer cups to form primers, uniformly irradiating said mixture with slow neutrons; passing said primers under a radioactively sensitive device at a preselected distance therefrom, measuring the radiation emitted from said mixture, translating said radiation into a potential proportional to said detected radiation, and applying said potential to means whereby only those primers causing a potential within a given range are selected and other primers not within a given potential range are rejected.

4. In a method of manufacturing primers, such that the quantity of primer composition therein may be kept uniform from primer to primer, the steps comprising: positioning equally radioactive sources of identical size in substantially identical places in the bottoms of primer cups superimposing thereon a wet primer composition, maintaining said primer composition in said wet condition, covering said composition with an anvil having a hole therein, passing said primer cups with their contents under a radioactively sensitive device at a preselected distance from said device; measuring the radiation emitted from each of said primer cups, translating said radiation into a potential proportional to said detected radiation, and applying said potential to means whereby only those primer cups causing a potential within a given range are selected and other primer cups not within a given potential range are rejected.

References Cited in the file of this patent

UNITED STATES PATENTS

| | | |
|---|---|---|
| 659,724 | Wills | Oct. 16, 1900 |
| 2,506,585 | Elliott | May 9, 1950 |
| 2,532,644 | Robinson | Dec. 5, 1950 |
| 2,592,434 | Krasnow | Apr. 8, 1952 |
| 2,617,526 | Lapointe | Nov. 11, 1952 |
| 2,640,788 | Rockett | June 2, 1953 |
| 2,723,351 | Garrison et al. | Nov. 8, 1955 |
| 2,729,214 | Broekhuysen et al. | Jan. 3, 1956 |
| 2,744,199 | Juterbock et al. | May 1, 1956 |
| 2,984,352 | Gilman | May 16, 1961 |